United States Patent
Yoda

(10) Patent No.: US 11,893,161 B2
(45) Date of Patent: Feb. 6, 2024

(54) GESTURE RECOGNITION BASED ON USER PROXIMITY TO A CAMERA

(71) Applicant: NATIONAL INSTITUTE OF ADVANCED INDUSTRIAL SCIENCE AND TECHNOLOGY, Tokyo (JP)

(72) Inventor: Ikushi Yoda, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 17/999,737

(22) PCT Filed: Apr. 27, 2021

(86) PCT No.: PCT/JP2021/016697
§ 371 (c)(1),
(2) Date: Nov. 23, 2022

(87) PCT Pub. No.: WO2021/246089
PCT Pub. Date: Dec. 9, 2021

(65) Prior Publication Data
US 2023/0168745 A1    Jun. 1, 2023

(30) Foreign Application Priority Data
Jun. 1, 2020  (JP) .................. 2020-095436

(51) Int. Cl.
G06T 7/20      (2017.01)
G06F 3/01      (2006.01)
H04N 23/611    (2023.01)

(52) U.S. Cl.
CPC ............. G06F 3/017 (2013.01); G06T 7/20 (2013.01); H04N 23/611 (2023.01)

(58) Field of Classification Search
None
See application file for complete search history.

(56) References Cited

U.S. PATENT DOCUMENTS

| | | | |
|---|---|---|---|
| 2010/0079413 A1* | 4/2010 | Kawashima | G06F 3/04883 715/781 |
| 2013/0241819 A1 | 9/2013 | Yamashita | |
| 2015/0234469 A1* | 8/2015 | Akiyoshi | G06F 3/04842 345/156 |

FOREIGN PATENT DOCUMENTS

| | | |
|---|---|---|
| JP | 2004-258837 A | 9/2004 |
| JP | 2015-195020 A | 11/2015 |

(Continued)

OTHER PUBLICATIONS

JP2015195020A (English Translation) Title: "Gesture Recognition Device, System, and Program for the Same" Inventor: Ikushi, Yoda Published on Nov. 5, 2015 (Year: 2015).*

(Continued)

*Primary Examiner* — Rinna Yi
(74) *Attorney, Agent, or Firm* — Hamre, Schumann, Mueller & Larson, P.C.

(57) ABSTRACT

A gesture recognition apparatus by which a gesture for an interface operation is performed includes an image capturer that captures distance image data, a closest point detector that detects a closest point from the imaging apparatus, a gesture measurer that calculates an input switching border for switching ON and OFF of interface input, a gesture recognizer that determines whether the input is ON or OFF, and an interface controller that performs the interface control associated with the gesture if it is determined that the input has been turned on.

6 Claims, 9 Drawing Sheets

(56) References Cited

FOREIGN PATENT DOCUMENTS

JP          2017-33397 A      2/2017
WO          2013/137412 A1    9/2013

OTHER PUBLICATIONS

Mitsunori Miki, Shotaro Hasegawa, Keiko Ono, and Hiroshi Shimomura. (2012). "Controlling Lighting by Gesture Detection using Kinect" The 26th Annual Conference of the Japanese Society for Artificial Intelligence 2012, Jun. 12, 2012, pp. 1-3, English abstract, cited in specification.
International Search Report and Written Opinion, International Patent Application No. PCT/JP2021/016697, dated Jun. 22, 2021, with English translation of Search Report (9 pages).
English translation of International Preliminary Report on Patentability issued in International Patent Application No. PCT/JP2021/016697, dated Dec. 6, 2022 (5 pages).

* cited by examiner

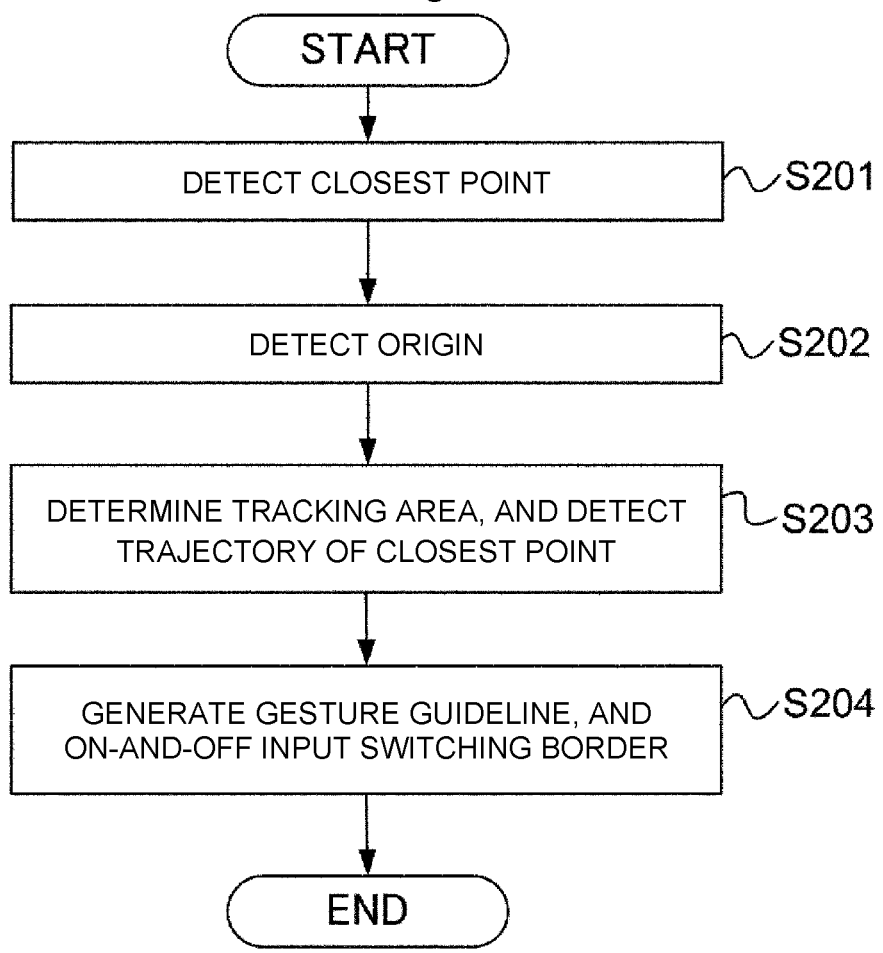

Fig. 3

SETTING INFORMATION STORAGE  264

(a) BASIC SETTING INFORMATION

| | | | |
|---|---|---|---|
| THE NUMBER OF TRACKING AREA DETERMINATION FRAMES | 1000 FRAMES | | |
| DEPTH FILTER | MINIMUM VALUE 1 mm | MAXIMUM VALUE 1500 mm | |
| GESTURE MARGIN | FRONT MARGIN 100 mm | DEPTH MARGIN 100 mm | |

(b) TRACKING AREA

| Ch1 | $(u_1, v_1)$ $(u_2, v_1)$ $(u_1, v_2)$ $(u_2, v_2)$ | NEAREST NEIGHBOR POINT 355 mm | FARTHEST POINT 387 mm |
|---|---|---|---|
| Ch2 | $(u_3, v_3)$ $(u_4, v_3)$ $(u_3, v_4)$ $(u_4, v_4)$ | NEAREST NEIGHBOR POINT 305 mm | FARTHEST POINT 346 mm |
| Ch3 | $(u_5, v_5)$ $(u_6, v_5)$ $(u_5, v_6)$ $(u_6, v_6)$ | NEAREST NEIGHBOR POINT 243 mm | FARTHEST POINT 262 mm |
| Ch4 | $(u_7, v_7)$ $(u_8, v_7)$ $(u_7, v_8)$ $(u_8, v_8)$ | NEAREST NEIGHBOR POINT 155 mm | FARTHEST POINT 203 mm |

Fig. 4

ASSOCIATED GESTURE STORAGE 266

| | GESTURE GUIDELINE | INPUT SWITCHING BORDER | ORIGIN | INTERFACE |
|---|---|---|---|---|
| Ch1 | $(x_1, y_1, z_1)$ $(x_2, y_2, z_2)$ | | $(x_5, y_5, z_5)$ | ENTER KEY |
| Ch2 | $(x_3, y_3, z_3)$ $(x_4, y_4, z_4)$ | | $(x_6, y_6, z_6)$ | SHIFT KEY LONG PRESS |
| Ch3 | | | | |
| Ch4 | | | | |

Fig. 8
(a)
(b)

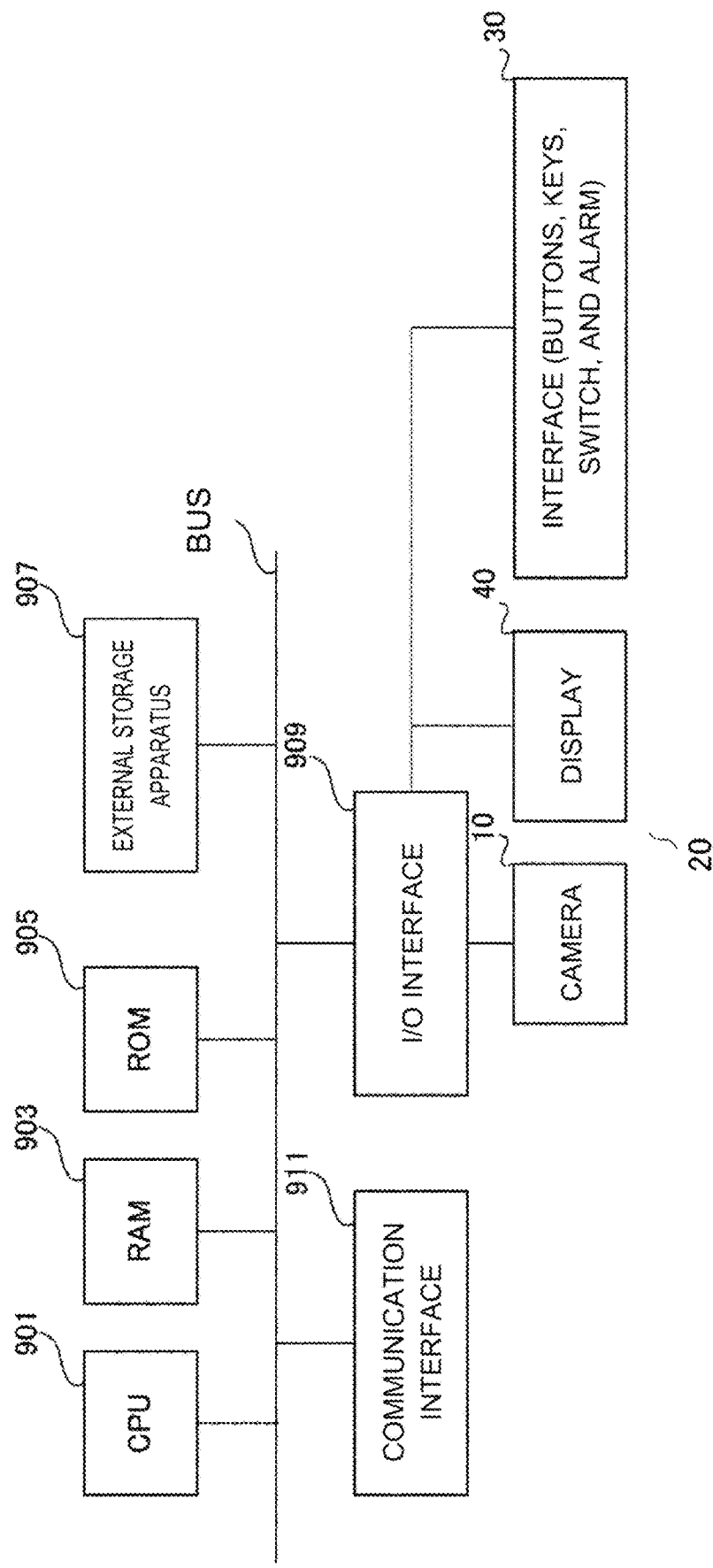

GESTURE RECOGNITION BASED ON USER PROXIMITY TO A CAMERA

TECHNICAL FIELD

The present invention relates to a gesture recognition apparatus, a system and a program thereof in which a gesture intended to be used for an interface operation is made at a position closest to a camera, thus allowing the gesture to achieve interface control of a personal computer and the like.

BACKGROUND ART

Conventionally, various interfaces have been developed to allow, in particular, physically handicapped disabled people to use a computer freely in a range they can move. For example, the interfaces include a switch for people capable of moving finger tips, an exhalation switch used with exhalation, and audio input software. However, individuals have different movable body sites and movable areas, and the states vary day by day. Accordingly, interfaces are often required to be developed in a custom-made manner in conformity with the states of the corresponding individuals. There is a problem that interfaces comfortably usable by many disabled people are not necessarily sufficiently provided.

As for gesture recognition based on image data, gesture detection by a gesture recognition system that uses distance image data has been proposed. Since there is difference among individuals in the gesture size and motion, Non Patent Literature 1 discloses a technique that discusses gestures minimizing the individual difference, allows natural and intuitive gestures for everyone, and securely performs illumination control through gesture detection.

CITATION LIST

Non Patent Literature

Non Patent Literature 1: Mitsunori Miki and other three, "Controlling lighting by gesture detection using Kinect", The 26th Annual Conference of the Japanese Society for Artificial Intelligence, 2012, Jun. 12, 2012, pp. 1-3

SUMMARY OF INVENTION

Technical Problem

Unfortunately, according to the technique disclosed in Non Patent Literature 1, since a gesture must be easily recognizable by the system, a gesture in conformity with the specifications of the system is required. Consequently, each individual's different gestures are not allowed to be stored and used for interface control.

The present invention has been made in view of the problem of the conventional art described above, and has the object to provide a gesture recognition apparatus which can measure and register gestures used for interface control, and allow the gestures to be used for interface control by making the gestures be performed in the closest proximity to the camera.

Solution to Problem

In view of the above object, the present invention provides a gesture recognition apparatus which recognizes a gesture of a user and performs interface control associated with the recognized gesture, the apparatus including: an image capturer that sequentially captures distance image data taken by an imaging apparatus; a closest point detector that detects, from the distance image data, a closest point from the imaging apparatus; a gesture measurer that calculates an input switching border for switching ON and OFF of interface input, based on a trajectory of the closest point that is the gesture of the user detected from a plurality of distance image data items; a gesture recognizer that determines whether the input is ON or OFF, in accordance with the input switching border; and an interface controller that performs the interface control associated with the gesture if it is determined that the input has been turned on.

It may be configured so that the gesture measurer includes a tracking area determiner that further determines, as a tracking area, a range where the closest point can reside in the distance image data items, the tracking area determiner determines the tracking area that involves the closest point detected from the distance image data items, and in gesture recognition, the closest point detector detects the closest point in the tracking area determined by the tracking area determiner. Setting the tracking area can negate the need to search for the closest point from the entire distance image data, prevent erroneous detection, and reduce the processing time.

It may be configured so that if the gesture recognizer detects that a time of detecting the closest point on an ON side of input is equal to or longer than a predetermined time, the interface controller performs control so as to apply a long press on a predetermined interface. This enables a long-press input to be achieved through a gesture. Accordingly, even a disabled person who has a difficulty to make a long-press input can easily and freely perform keyboard input.

It may be configured so that the apparatus further includes an associated gesture storage that stores the gesture and an interface associated with the gesture, wherein if a plurality of gestures are stored, upon detection of the closest point the gesture recognizer performs gesture recognition by identifying which gesture the point is associated with through comparison with the input switching border.

It is configured so that the gesture measurer calculates a gesture guideline, based on a trajectory of the detected closest point, and the gesture recognizer makes a display unit to display the gesture guideline, thereby facilitating the user to make an easily recognizable gesture.

It may be configured so that the gesture measurer detects an origin on an OFF side of input, and the gesture recognizer determines ON or OFF of input by determining whether the detected closest point resides in a space including the origin relative to the input switching border.

A gesture recognition program is provided, which recognizes a gesture of a user and performs interface control associated with the recognized gesture, the program making a computer to function as a gesture recognition apparatus including: an image capturer that sequentially captures distance image data taken by an imaging apparatus; a closest point detector that detects, from the distance image data, a closest point from the imaging apparatus; a gesture measurer that calculates an input switching border for switching ON and OFF of interface input, based on a trajectory of the closest point that is the gesture of the user detected from a plurality of distance image data items; a gesture recognizer that determines whether the input is ON or OFF, in accordance with the input switching border; and an interface controller that performs the interface control associated with the gesture if it is determined that the input has been turned on.

A gesture recognition system is provided, which includes: an imaging apparatus which takes distance image data; and a gesture recognition apparatus which recognizes a gesture of a user and performs interface control associated with the recognized gesture, wherein the imaging apparatus images a body of the user, the gesture recognition apparatus comprises: an image capturer that sequentially captures distance image data taken by an imaging apparatus; a closest point detector that detects, from the distance image data, a closest point from the imaging apparatus; a gesture measurer that calculates an input switching border for switching ON and OFF of interface input, based on a trajectory of the closest point that is the gesture of the user detected from a plurality of distance image data items; a gesture recognizer that determines whether the input is ON or OFF, in accordance with the input switching border; and an interface controller that performs the interface control associated with the gesture if it is determined that the input has been turned on.

Advantageous Effects of Invention

The present invention allows the user to make a gesture in the closest proximity to the camera and uses the trajectory for gesture recognition. Accordingly, the gesture that the user intends to use for an interface can be easily used for interface control without causing the user to be aware of a body site.

Also when the user makes a gesture that he or she intends to use multiple times and performs gesture measurement, the gesture can be used for interface control. Consequently, even a user who has a limited movable area can register a gesture in conformity within his or her movable area and use the gesture for interface control.

BRIEF DESCRIPTION OF DRAWINGS

FIG. 2 is a flowchart showing an example of a flow of processes of measuring a gesture of a user in a gesture measurement stage performed in a gesture recognition apparatus 20 of the present invention.

FIG. 3 shows an example of data storage content of a setting information storage 264 stored in a storage 260.

FIG. 4 shows an example of data storage content of an associated gesture storage 266 stored in the storage 260 of the present invention.

FIG. 8 shows examples of a gesture motion for turning the input ON and distance image data for turning the input OFF in a gesture recognition stage.

FIG. 9 shows an example of a hardware configuration diagram of the gesture recognition apparatus 20.

DESCRIPTION OF EMBODIMENTS

To perform interface control associated with a gesture, the control is classified into a gesture measurement stage that measures and stores the gesture for performing the interface control, and a gesture recognition stage that recognizes whether the gesture is made or not, and performs the interface control associated with the gesture upon determination that the gesture is made. In a case of performing multiple types of interface control, gestures associated with the respective types of interface control are individually measured and stored, and in the gesture recognition stage, it is recognized which gesture corresponds to one or multiple stored gestures. Hereinafter, an embodiment of the present invention is described with reference to the drawings.

Figure 1:
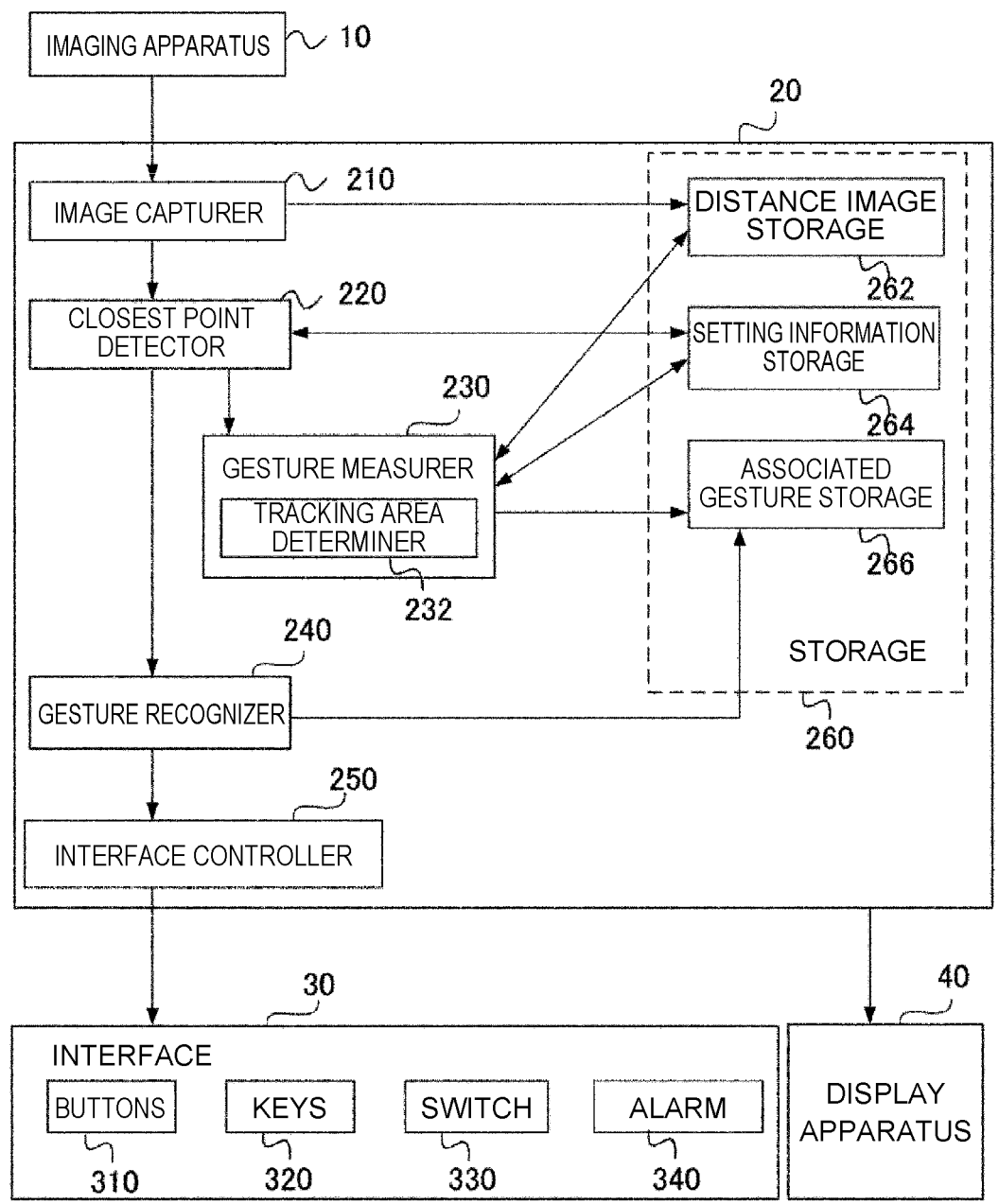
FIG. 1 is a block diagram showing an example of a gesture recognition system that includes a gesture recognition apparatus according to the present invention.

FIG. 1 is a block diagram showing an example of a gesture recognition system that includes a gesture recognition apparatus according to the present invention. In FIG. 1, a gesture recognition apparatus 20 is connected to an imaging apparatus 10, an interface 30, and a display apparatus 40. The imaging apparatus 10 is a camera that takes a three-dimensional distance image, and may be, for example, what is called a stereo camera that includes two cameras, or a camera that includes a camera and a distance image sensor and can take a three-dimensional distance image. For example, the imaging apparatus 10 images a user making a gesture used for interface control, such as a gesture of moving a finger. The imaging apparatus 10 obtains moving image data through imaging, and transmits the data to the gesture recognition apparatus 20. The interface 30 is an interface controlled by the gesture recognition apparatus 20, and for example, includes buttons 310, keys 320, a switch 330, and an alarm 340. However, there is no limitation thereto. The interface may be a mouse, a keyboard, a touch panel or the like. The display apparatus 40 is a display, and displays an image and the like taken by the imaging apparatus 10.

The gesture recognition apparatus 20 includes an image capturer 210, a closest point detector 220, a gesture measurer 230, a gesture recognizer 240, an interface controller 250, and a storage 260.

The image capturer 210 captures, for example, distance image data which has been taken by the imaging apparatus 10 and in which the user has been imaged. The captured distance image data is moving image data, and is two or more frame image data items, and includes a parallax or distance data. That is, two image data items may be taken from the imaging apparatus 10, which is a stereo camera, and the parallax may be calculated by the image capturer 210. The parallax data is herein assumed. However, in a case where the imaging apparatus is not a stereo camera but is a camera including a rangefinder, image data and distance data may be captured. The herein described "distance image data" is image data items (frame images) at the respective time points in the moving image data, which is a time-series image. The image capturer 210 outputs the input image data and distance data to the closest point detector 220. The distance image data captured by the image capturer 210 is stored in a distance image storage 262.

The closest point detector 220 detects the closest point from the imaging apparatus 10 to measure or recognize a gesture from the distance image data captured by the image capturer 210. The closest point detector 220 searches for a point having distance data closest to the imaging apparatus 10, based on distance data and the like included in the distance image data, with respect to each position frame image data item in the distance image data, and detects the point as the closest point.

The user makes a gesture at a position where a body site performing the gesture to be recognized is closest to the imaging apparatus 10. For example, as with a finger pointing gesture, only an index finger is stuck up, and the distal end of the index finger of the hand is positioned to be at the closest point. The index finger is then moved upward and downward several times, and the vertical motion by the index finger is measured as a first gesture. A motion of swinging the same index finger or the index finger of another hand left and right can be measured and stored as a second gesture, thus a different gesture can be registered and this gesture can be used for different interface control. Since the closest point detector 220 detects the distal end of the index finger as the closest point, this detector can detect the motion of the gesture. Note that the vertical motion and the lateral motion by the index finger are herein exemplified and described. However, there is no limitation thereto. The motion may be a motion of moving an elbow forward and then moving the arm, a motion of moving toes or the like.

The closest point detector 220 may detect, as the closest point, a point having the closest distance data item from among all the distance image data items. In order to prevent erroneous detection and reduce the processing time, the entire distance image data may be searched and detected for the first frame image only, and for the next and subsequent frame image data, only proximity to coordinates where the closest point has been detected in the previous frame may be searched and detected. Furthermore, it may be configured so that in the gesture recognition stage, in a case where the tracking area is stored as a range where the gesture of the user can reside, i.e., a range where the closest point can reside, in a setting information storage 264, the closest point is detected in the tracking area.

In the tracking area determination during gesture measurement, the closest point detector 220 detects the closest point multiple times as many as the number of tracking area determination frames stored in the setting information storage 264. By the gesture measurement, the tracking area, the nearest neighbor point, which is the value of the minimum distance of the closest point from the imaging apparatus 10, and the farthest point, which is the value of the maximum distance are stored. Accordingly, during gesture recognition, the closest point detector 220 can read the tracking area, the nearest neighbor point, the farthest point, and the margin value from the setting information storage 264, and reduce the search range by the tracking area where the closest point is detected, and detect the closest point at the distance of the range calculated by adding the margin value to the nearest neighbor point and the farthest point, which can prevent erroneous detection.

To measure the gesture, the gesture measurer 230 calculates an input switching border for switching ON and OFF for interface input, based on the trajectory, which is a group of closest points detected from the distance image data items by the gesture motion of the user. The coordinate point of the closest point in each distance image data item previously detected by the closest point detector 220 during gesture measurement is displayed side-by-side with the closest point in the current distance image data item, thereby allowing the trajectory by the gesture motion to be obtained. For example, the gesture measurer 230 may be configured to calculate two points having the longest distance, based on the trajectory of the closest points by the distance image data items for multiple frames obtained by the user's performing the same gesture motion multiple times, and calculate the plane that passes through the midpoint of the line segment connecting the two points and is perpendicular thereto, thereby calculating the input switching border. However, there is no limitation thereto. It may be configured so that the trajectory by the gesture motion is obtained, the line approximating the trajectory is calculated, and the perpendicular bisecting plane is calculated. The gesture measurer 230 may be configured to adopt the start point of the gesture motion as the origin, calculate the input switching border, and subsequently set a space where the origin resides, as input OFF.

The gesture measurer 230 stores the calculated input switching border, the gesture guideline, and the origin in association with a predetermined interface, in an associated gesture storage 266.

The gesture measurer 230 includes a tracking area determiner 232. The tracking area determiner 232 determines the tracking area that involves the closest point detected from the distance image data items during gesture measurement. The tracking area is a range where the closest point can reside. Searching all the distance image data items to detect the closest point requires a certain processing time and increases the possibility of erroneous detection. Accordingly, the tracking area is determined during gesture measurement, which allows to search only the inside of the tracking area during gesture recognition and, thereby facilitate the reduction in the processing time.

The tracking area determiner 232 determines, as the tracking area, a range where the closest point can reside in the distance image data during gesture measurement. For example, the tracking area determiner 232 may determine the tracking area by obtaining the sum of inter-frame differences with respect to the number of tracking area determination frames stored in the setting information storage 264. For example, for the distance image data, the inter-frame difference from the previous frame may be calculated, noise may be reduced by a morphological operation, contours may be extracted from the sum of the inter-frame differences as many as the predetermined number of frames, and a rectangle involving the contour group may be calculated, thereby calculating the tracking area.

The tracking area determination may be manually performed. For example, the trajectory of the closest points that is a set of closest points obtained during gesture measurement may be displayed, the user may designate the rectangle involving the trajectory of the closest points on the display screen of the display apparatus 40 by a touch panel, a mouse or the like, and the tracking area may be set by the tracking area determiner 232 accepting the designation. The tracking area determined by the tracking area determiner 232 is stored in the setting information storage 264, for example, as the coordinate values of the four corners of the rectangle.

The gesture recognizer 240 determines whether the input is ON or OFF, in accordance with the input switching border calculated by the gesture measurer 230. Specifically, in the gesture recognition stage, in the case where multiple gestures are registered, the gesture recognizer 240 performs gesture recognition as to which gesture is associated is performed by comparison with the multiple input switching borders, based on the closest point detected by the closest point detector 220 and the input switching border stored in the associated gesture storage 266. For example, the gesture recognizer 240 may be configured to obtain the coordinate points of the closest points for multiple frames, and determine which input switching border the coordinate point is associated with, thereby recognizing the gesture concerned. In case it is determined that presence is in the input-ON-side space, it may be configured to turn on the input when presence is determined to be in the input-ON side-space sequentially over multiple frames. In case it is determined that presence is in the input-OFF-side space, it may be configured to turn off the input immediately when it is determined that presence is in the input-OFF-side space. The gesture recognizer 240 may be configured to set the point serving as the origin of input, and recognize the space on the side where the origin is relative to the input switching border plane as an input-OFF side. When the point goes to and fro about the input switching border, the input may be configured not to be input for a predetermined time after detection of input ON in order to prevent frequent ON-and-OFF input.

The gesture recognizer 240 reads the gesture guideline calculated by the gesture measurer 230 at the start of the gesture recognition from the associated gesture storage 266, and displays the gesture guideline on the display apparatus 40. By displaying the gesture guideline, the user can easily perform gesture for desired interface control.

In a case where a long-press input is stored as an associated interface, when the gesture recognizer 240 detects that the time of detecting the closest point in the space on the ON side of input is equal to or longer than a predetermined time, based on the input switching border of ON and OFF, the interface controller 250 may be configured to perform long-press input control for a predetermined interface. If a long-press case and a not-long-press case are stored for one gesture in the associated gesture storage 266, the gesture recognizer 240 can be configured to measure the time where the closest point is detected on the ON-side space with respect to the input switching border, and control the predetermined interface so as to be long press if the time is a predetermined time or longer, and be normal input that is not a long press if the time is less than the predetermined time.

The interface controller 250 performs interface control associated with the gesture recognized by the gesture recognizer 240. Specifically, interface controller 250 reads the associated gesture storage 266 of the storage 260, and the interface control associated with the predetermined gesture content, and the interface 30 is controlled. For example, when the gesture corresponding to a channel 1 is recognized, the interface controller 250 reads the associated gesture storage 266, the interface control associated with the gesture on the channel is performed, for example, the switch is turned on. In a case where the interface stored in the associated gesture storage 266 is a long press, and a case where the gesture recognizer 240 recognizes that presence is on the ON-side for the predetermined time or longer, the interface control associated with the long press is performed.

The storage 260 includes the distance image storage 262, the setting information storage 264, and the associated gesture storage 266. The distance image storage 262 stores the distance image data items captured by the image capturer 210 from the imaging apparatus 10. The distance image stored in the distance image storage 262 is appropriately read by the gesture measurer 230 or the gesture recognizer 240.

The setting information storage 264 stores the number of tracking area determination frames, the minimum value and the maximum value of the depth filter, the gesture front margin and depth margin, and the tracking area. The number of tracking area determination frames is the number of frames required to determine the tracking area. The depth filter is the distance recognizable by the imaging apparatus 10, and it stores its minimum value and maximum value.

The gesture margin is a margin for the measured gesture, and it stores the margin value on the front side and the margin value on the depth side. The setting information storage 264 further stores the tracking area. The tracking area determined by the tracking area determiner 232 is stored in a gesture-by-gesture basis. For example, as the tracking area, the screen coordinates at the four corners of a rectangle, and the nearest neighbor point that corresponds the minimum value of the distance and the farthest point that corresponds the maximum value of the distance among the closest points measured during gesture measurement are stored.

The associated gesture storage 266 is a storage that stores the content of interface control associated with the motion of the gesture in an associated manner. When the gesture recognizer 240 recognizes that a predetermined gesture is made, the interface controller 250 reads the associated gesture storage 266, and performs the interface control associated with the recognized gesture. The associated gesture storage 266 stores the gesture input switching border associated with the gesture measured by the gesture measurer 230 on a gesture-by-gesture basis, the origin, and the content of interface control associated with the gesture guideline.

FIG. 2 is a flowchart showing an example of a flow of processes of measuring a gesture of a user in the gesture measurement stage performed in a gesture recognition apparatus 20 of the present invention. In the gesture measurement stage, a gesture intended to be used for interface control is performed multiple times at a position that is nearest neighbor to the imaging apparatus 10, thus measuring the gesture.

When the gesture measurement is started, the closest point detector 220 detects the closest point from the distance image data captured by the image capturer 210 (step S201). The closest point detector 220 detects the closest point having a distance closest to the imaging apparatus 10, from the distance image data. The closest point detector 220 detects the closest point in the frame image every time the frame image, which is the distance image data item is captured.

The closest point detector 220 refers to the minimum value and the maximum value of the depth filter stored in the setting information storage 264, and detects the closest point in the range between the stored minimum value and maximum value. As for the method of detecting the closest point, the entire image data may be sequentially searched. Alternatively, for example, in order to detect the closest point, it may be configured to search the entire distance image data only for the first frame image data, and for the next frame image and thereafter, the search can be started from the proximity of the coordinates at which the closest point in the previous frame image has been detected. Furthermore, the vector of the closest point in the previous frame image and the closest point in the current frame image is calculated, and the closest point of the next frame image is retrieved based on the vector.

After the gesture measurement is started, the gesture measurer 230 detects the start point that is the closest point at the start of the gesture (step S202). The start point is the closest point when the user starts the gesture. Typically, the start point serves as the origin, and is positioned on the OFF side of interface input. The detected start point is stored in the associated gesture storage 266.

When the gesture measurement is started and the user performs the gesture motion, the gesture measurer 230 performs tracking area determination, and detects the trajectory of the closest point (step S203). The tracking area determiner 232 of the gesture measurer 230 performs the tracking area determination. Searching the entire distance image data to detect the closest point requires a certain processing time. Accordingly, as for the tracking area, in order to improve the speed of processing, a range where the closest point can reside is determined as the tracking area, thereby configuring setting that allows the closest point to be easily detected in the gesture recognition stage.

The tracking area determiner 232 determines, as the tracking area, a rectangle involving the closest points of the distance image data items that are sequentially received frame images. The tracking area determiner 232 reads, from the setting information storage 264, the number of tracking area determination frames stored as basic setting information, and collects the distance image data items as many as the number of frames. The tracking area determiner 232 calculates the inter-frame difference between the previous frame and the current frame multiple times as many as the number of collected frames, reduces noise by the morphological operation, subsequently calculates the sum of inter-frame differences, extracts the set of contours in the summation image, and calculates the rectangle involving the set of contours, thus determining the tracking area. However, there is no limitation thereto. Another method may be adopted only if the method allows the tracking area determiner 232 to collect the trajectory of the closest point detected from each frame image, and calculate the rectangle involving the trajectory. Alternatively, the tracking area may be set by the user manually designating the rectangle involving the trajectory of the closest points. The calculated tracking area is stored in the setting information storage 264.

The gesture measurer 230 detects the trajectory of the closest points from the distance image data items as many as the predetermined number of frames. Among the detected closest points, the point having the distance closest to the imaging apparatus 10 among the detected closest points is adopted as the nearest neighbor point, and the point that is farthest is adopted as the farthest point, and the points are stored in the setting information storage 264. This is because the closest point does not necessarily always reside at the same distance from the imaging apparatus 10 when the gesture motion is performed. The stored minimum value and maximum value are used when the closest point detector 220 searches for the closest point at the gesture recognition, together with the value of the margin of the basic setting information.

The gesture measurer 230 generates and calculates the gesture guideline and the input switching border of ON and OFF of interface input (step S204). The gesture measurer 230 obtains two points having the largest distances from the trajectory that is the set of closest points obtained from the distance image data items that have been obtained by gesture measurement and are as many as the predetermined number of frames, adopts the line segment connecting the two points as the gesture guideline, and stores the guideline in the associated gesture storage 266. Here, if the start point detected in step S202 is close to the midpoint of the line segment connecting the two points, correction of adopting, as the origin, the point closer to the start point between the two points may be performed.

The gesture measurer 230 calculates the perpendicular bisecting plane passing through the midpoint of the two points, thus calculating the plane that is the input switching border for switching ON and OFF of interface input. The corrected origin, the gesture guideline, and the input switching border are stored in the associated gesture storage 266 in association with the interface.

FIG. 3 shows an example of data storage content of a setting information storage 264 stored in a storage 260.

The setting information storage 264 stores the basic setting information and tracking area information. The number of tracking area determination frames, the depth filter, and the gesture margin are stored as the basic setting information. These include the number of tracking area determination frames, which is the number of frames required for tracking area determination, and the minimum value and the maximum value of the depth filter, which are distances recognizable by the imaging apparatus 10. The gesture margin is a margin value, which is to be added to the value of the nearest neighbor point and the value of the farthest point of the closest points measured during gesture measurement.

The screen coordinates of four corners of the rectangle of the tracking area determined by the tracking area determiner 232, and the value of the nearest neighbor point and the value of the farthest point among the closest points detected during gesture measurement are stored as the tracking area information. Here, the coordinate values of the four corners are stored, however, alternatively, for example, it may be configured to store the coordinate value of a single point and the vertical and lateral lengths. The nearest neighbor point is the distance value of the point closest to the imaging apparatus 10 among the closest points measured by the gesture measurer 230. Likewise, the farthest point is the distance value of the point farthest from the imaging apparatus 10 among the measured closest points. During gesture recognition, the tracking area information is read and used to detect the closest point.

FIG. 4 shows an example of data storage content of the associated gesture storage 266 stored in the storage 260.

The associated gesture storage 266 stores the gesture and the interface in association with each other. To register multiple gestures and interfaces, each gesture is stored on a channel-by-channel basis. Each gesture is identified by storing the gesture guideline, the input switching border plane, and the origin. A long press may be stored as an interface. For one gesture, a normal case and a case of a long press may be stored as interfaces. The gesture guideline is a guideline similar to the gesture measured in the gesture measurement stage. By displaying the gesture guideline in the gesture recognition stage, the user can easily make a desired gesture. Here, the three-dimensional coordinates of two points for identifying the line segment of the gesture guideline is stored.

The input switching border is a plane serving as a boarder where ON and OFF of interface input is switched. The input switching border is the perpendicular bisecting plane passing through the midpoint of the gesture guideline. For example, the equation of a plane that perpendicularly bisecting the three-dimensional coordinates of the two points defining the gesture guideline. The origin is the gesture start point residing on the input-OFF side. In principle, the coordinates of the start point at the gesture recognition is stored as the origin.

Figure 5:
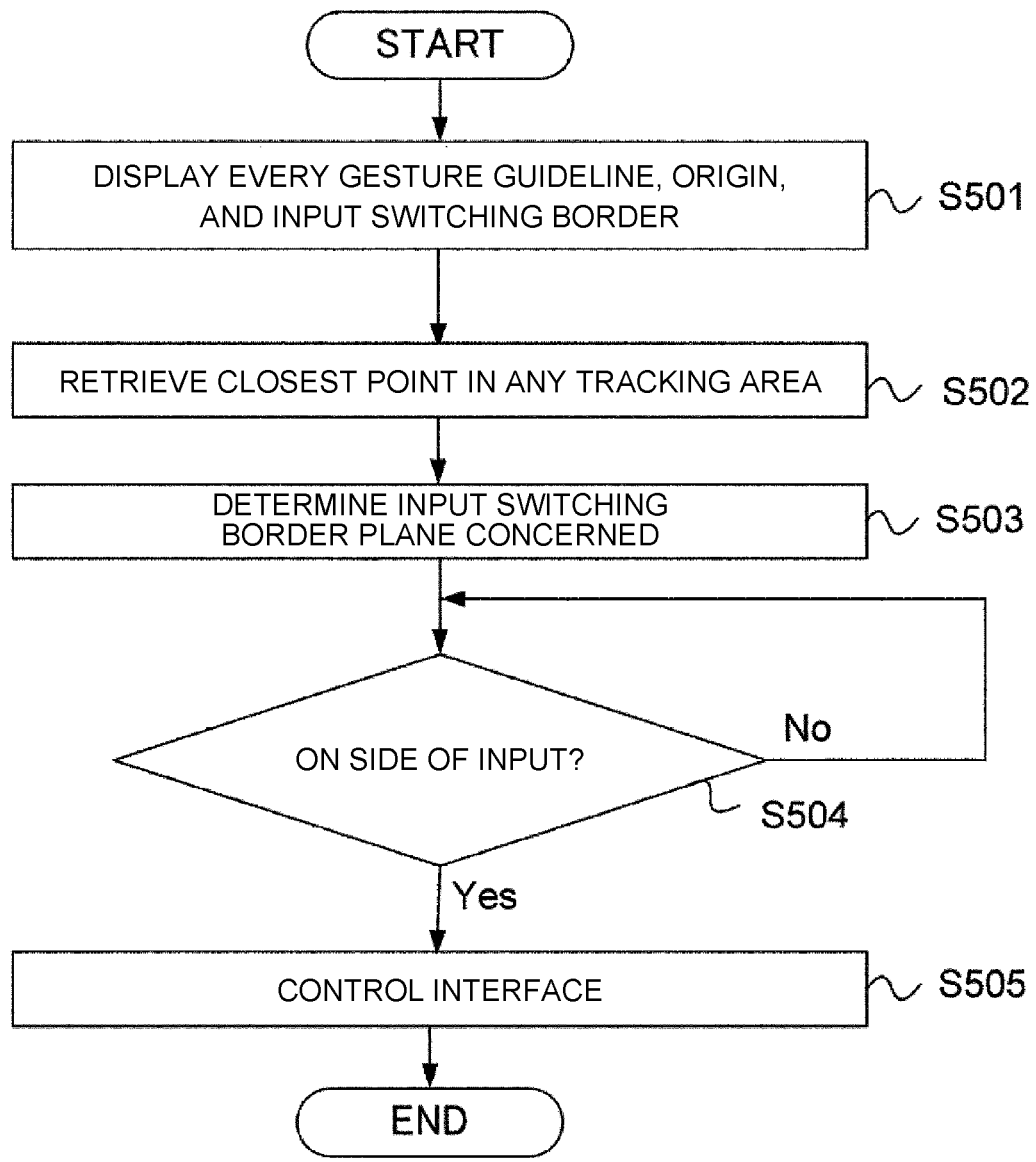
FIG. 5 is a flowchart showing an example of a flow of processes of recognizing the gesture of the user in a gesture recognition stage performed in the gesture recognition apparatus 20 of the present invention.

FIG. 5 is a flowchart showing an example of a flow of processes of recognizing the gesture of the user in a gesture recognition stage performed in the gesture recognition apparatus 20 of the present invention. In the gesture recognition stage, the gesture recognition apparatus 20 recognizes which gesture among the stored gestures made at the position closest to the imaging apparatus 10 by the gesture recognizer 240, and performs the interface control associated with the recognized gesture.

When the gesture recognition is started, the gesture recognizer 240 displays the gesture guideline of every channel, the origin, and the input switching border (step S501). The gesture recognizer 240 reads the every stored gesture guideline, the origin, and the input switching border from the associated gesture storage 266, and displays the read items on the display apparatus 40.

The closest point detector 220 retrieves and detects the closest point in any tracking area (step S502). The closest point detector 220 reads the tracking area stored in each channel, the minimum value and the maximum value of the distance of the closest point, and the margin value, from the setting information storage 264, and retrieves and detects the closest point, in the range of the tracking area, from the distance image data captured by the image capturer 210, based on the minimum value and the maximum value of the distance of the closest point, and the margin value. Here, for the first frame image, the closest point can be retrieved and detected in the range of the tracking area based on the minimum value, the maximum value of the distance of the closest point, and the margin value. For the next frame image and thereafter, in the range of the tracking area, and in the range of the minimum value and the maximum value of the distance of the closest point and the margin value, the search can be started from the proximity to the coordinates where the closest point in the previous frame image has been detected. Furthermore, the vector of the closest point in the previous frame image and the closest point in the current frame image is calculated, and for the next frame, the closest point in the image is retrieved in proximity to the closest point in the previous frame based on the vector.

The gesture recognizer 240 determines which input switching border plane the detected closest point resides on (step S503). The gesture recognizer 240 reads one or two or more input switching border planes stored in the associated gesture storage 266, and determines which input switching border plane the closest point detected by the closest point detector 220 resides on. In this determination, to prevent erroneous determination, it is determined which input switching border plane the closest points in the sequential frames reside. If it is determined that all the points are on the same input switching border plane, it may be determined that the point is on the input switching border plane.

When the gesture recognizer 240 determines the input switching border plane concerned, this recognizer determines whether the closest point is on the ON-side of input with respect to the input switching border plane (step S504). More specifically, the gesture recognizer 240 may determine whether or not the closest point resides in the space including the origin with respect to the input switching border plane. If the closest point resides in the space including the origin with respect to the input switching border plane, this recognizer may determine that input is OFF. If the closest point does not reside in the space including the origin, this determiner may determine that input is ON. If the point is not on the ON side (No), the determination of whether the closest point is on the ON side or not is subsequently continued.

If the point is on the ON side (Yes), the gesture recognizer 240 reads the interface associated with the gesture from the associated gesture storage 266, and performs interface control (step S505). For example, if it is stored that the switch is turned on in the associated gesture storage 266, upon determination of the ON side, the interface control is performed so as to press the switch. In a case where a long press is stored in the associated gesture storage 266, upon detection of the closest point on the input-ON side for a predetermined time or longer, the gesture recognizer 240 may perform the interface control of a long press. However, there is no limitation thereto. In a case where the closest point is detected on the input ON side, and a long input is associated as an interface, long-press control can be performed even with an input for a time less than the predetermined time. In a case where a normal interface and a long-press input interface are stored in the associated gesture storage 266 in association with a single gesture, the gesture recognizer 240 can be configured to determine whether or not the closest point resides in the input-ON-side space for the predetermined time or longer, and perform interface control associated with the normal input if the time is less than the predetermined time, and perform interface control associated with the long-press input if the time is equal to or longer than the predetermined time.

Figure 6:
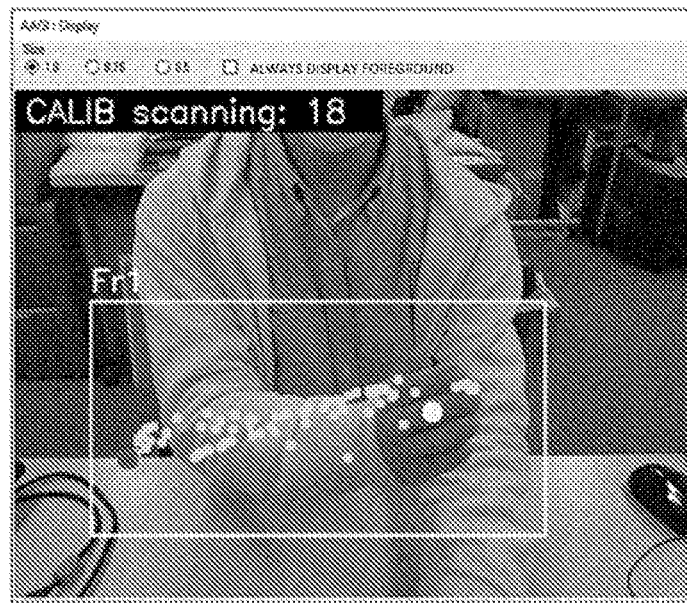
FIG. 6 shows an example of a screen where the trajectory of a closest point detected from a plurality of distance image data items, and a currently taken distance image data item are displayed on a display apparatus 40, in a gesture measurement stage.

FIG. 6 shows an example of a screen where the trajectory of a closest point detected from a plurality of distance image data items, and a currently taken distance image data item are displayed on a display apparatus 40, in a gesture measurement stage. In the gesture measurement stage, the gesture measurer 230 displays the previous closest points detected by the closest point detector 220, with the currently taken distance image data, as the trajectory of the closest points.

Figure 7:
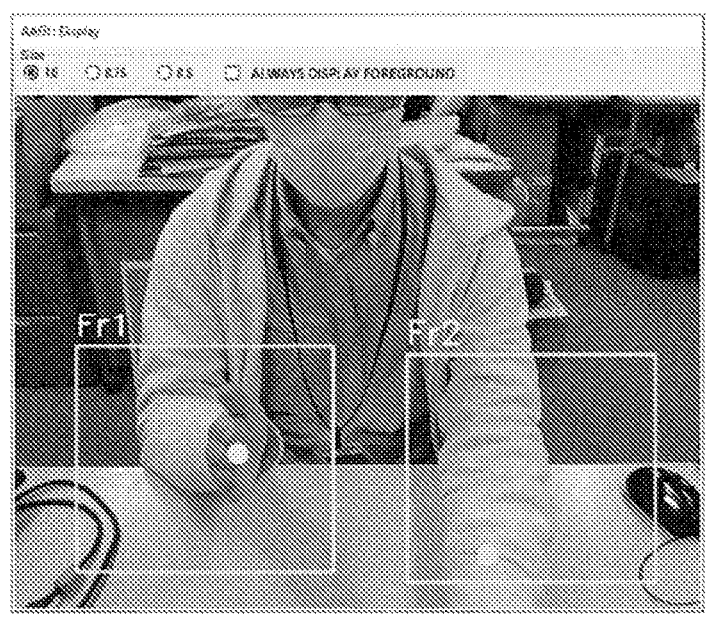
FIG. 7 shows an example of a display screen displayed on the display apparatus 40 during gesture recognition.

FIG. 7 shows an example of a display screen displayed on the display apparatus 40 during gesture recognition. In the gesture recognition stage, the display apparatus 40 displays, together with the currently taken distance image data, all the tracking areas associated with the recognizable gestures, the gesture guideline, the origin and the input switching border stored in the associated gesture storage 266, with the currently detected closest point.

FIG. 8 shows examples of a gesture motion for turning input ON and distance image data for turning input OFF in the gesture recognition stage. In FIG. 8(*a*), the closest point detected from the current distance image data resides on the gesture guideline and in the space including the origin with respect to the input switching border. Accordingly, the gesture recognizer 240 determines that the input is OFF. In FIG. 8(*b*), the closest point detected from the current distance image data resides on the gesture guideline and in the space opposite to the origin with the input switching border intervening therebetween. Accordingly, the gesture recognizer 240 determines that the input is ON.

FIG. 9 shows an example of a hardware configuration diagram of the gesture recognition apparatus 20. The gesture recognition apparatus 20 may include a personal computer owned by a system user, and a program executed on the personal computer.

The personal computer includes: a CPU (Central Processing Unit) 901; a RAM (Random Access Memory) 903, a ROM (Read Only Memory) 905, an external storage apparatus 907 that is a computer-readable recording medium, such as a hard disk drive, an I/O interface 909, and a communication interface 911 for connection to a communication network line that are connected to the CPU 901 via a bus. A camera 10 as an imaging apparatus, a buttons, a switch and an alarm as the interface 30, and a display 40 as the display apparatus are connected to the I/O interface 909. In this case, for example, the functions of the image capturer 210, the closest point detector 220, the gesture measurer 230, the gesture recognizer 240 and the interface controller 250 of the gesture recognition apparatus 20 are achieved by the program executed on the personal computer. The function of the storage 260 is achieved by the external storage apparatus 907. The program that achieves various functions is stored in the external storage apparatus 907, and is read by the RAM 903 and is subsequently executed by the CPU 901.

REFERENCE SIGNS LIST

10 imaging apparatus
20 gesture recognition apparatus
30 interface
40 display apparatus
210 image capturer
220 closest point extractor
230 gesture measurer
240 gesture recognizer
250 interface controller
260 storage

The invention claimed is:

1. A gesture recognition apparatus recognizing a gesture of a user and performing interface control associated with the recognized gesture, the gesture recognition apparatus comprising:
a processor which, by executing instructions, function as:
an image capturer that sequentially captures distance image data taken by an imaging apparatus in which a user has been imaged, and outputs the input image data and the distance data on a display screen;
a closest point detector that detects, from the distance image data displayed on the display screen, a closest point from the imaging apparatus;
a gesture measurer that calculates an input switching border, which is currently displayed with the distance image data, a tracking area associated with recognizable gestures, a gesture guideline, and an origin of the gesture, for switching ON and OFF of interface input, based on a trajectory of the closest point that is the gesture of the user detected from a plurality of distance image data items;
a gesture recognizer that determines whether the input is ON or OFF, in accordance with the input switching border; and
an interface controller that performs the interface control associated with the gesture when it is determined that the input has been turned on, wherein
the gesture measurer detects start point of the gesture of the user as the origin and an OFF side of input, and
the gesture recognizer determines ON or OFF of input by determining whether the detected closest point resides in a space that includes the origin relative to the input switching border.

2. The gesture recognition apparatus according to claim 1, wherein the gesture measurer comprises;
a tracking area determiner that detects, as the tracking area, a range in which the closest point to the distance image data items is detected, and in gesture recognition, the closest point detector detects the closest point in the tracking area determined by the tracking area determiner.

3. The gesture recognition apparatus according to the gesture recognition apparatus according to wherein, when the gesture recognizer detects that a time to detect the closest point on an ON side of input is equal to or greater than a predetermined time, the interface controller applies a long press on a predetermined interface.

4. The gesture recognition apparatus according to claim 1, further comprising:
an associated gesture storage that stores the gesture; and
an interface associated with the gesture, wherein, when a plurality of gestures are stored, upon detection of the closest point, the gesture recognizer identifies with which gesture the point is associated through comparison with the input switching border.

5. The gesture recognition apparatus according to claim 1, wherein the gesture measurer calculates the gesture guideline based on the trajectory of the detected closest point, and the gesture recognizer causes a display unit to display the gesture guideline on the display screen.

6. A gesture recognition method for recognizing a gesture of a user and performing interface control associated with the recognized gesture, the method comprising:
sequentially capturing, by an image capturer, distance image data taken by an imaging apparatus in which a user has been imaged, and outputting the input image data and the distance data on a display screen;
detecting, from the distance image data displayed on the display screen by a closest point detector, a closest point from the imaging apparatus;
calculating, by a gesture measurer, an input switching border, which is currently displayed with the distance image data, a tracking area associated with recognizable gestures, a gesture guideline, and an origin of the gesture, for switching ON and OFF of interface input, based on a trajectory of the closest point that is the gesture of the user detected from a plurality of distance image data items;
determining, by a gesture recognizer, whether the input is ON or OFF, in accordance with the input switching border; and
performing, by an interface controller, the interface control associated with the gesture when it is determined that the input has been turned on, wherein
detecting, by the gesture measurer, start point of the gesture of the user as the origin and an OFF side of input, and
determining, by the gesture recognizer, ON or OFF of input by determining whether the detected closest point resides in a space that includes the origin relative to the input switching border.

* * * * *